United States Patent [19]

Weiss et al.

[11] Patent Number: 4,530,986

[45] Date of Patent: Jul. 23, 1985

[54] ELASTOMERIC SULFONATE TERPOLYMERS AND PROCESS FOR FORMING THE SULFONATED TERPOLYMERS

[75] Inventors: Robert A. Weiss, Storrs, Conn.; Robert D. Lundberg, Bridgewater; Allen C. Werner, Chatham, both of N.J.

[73] Assignee: Exxon Research and Engineering Co., Florham Park, N.J.

[21] Appl. No.: 496,280

[22] Filed: May 19, 1983

Related U.S. Application Data

[63] Continuation of Ser. No. 326,544, Dec. 2, 1981, abandoned, which is a continuation-in-part of Ser. No. 278,423, Jun. 29, 1981, abandoned, which is a continuation of Ser. No. 117,197, Jan. 31, 1980, abandoned.

[51] Int. Cl.³ .......................................... C08F 228/02
[52] U.S. Cl. ........................... 526/240; 260/DIG. 31; 526/241; 526/287
[58] Field of Search ....................... 526/240, 287, 241

[56] References Cited

U.S. PATENT DOCUMENTS

| | | | |
|---|---|---|---|
| 2,913,429 | 11/1959 | Floria | 526/287 |
| 3,306,871 | 2/1967 | Miller | 526/287 |
| 3,396,136 | 8/1968 | Dickerson | 526/287 |

Primary Examiner—Christopher A. Henderson
Attorney, Agent, or Firm—Richard E. Nanfeldt

[57] ABSTRACT

The present invention relates to a free radical emulsion polymerization process for the formation of substantially gel-free terpolymers of a major portion of a mixture of butadiene and styrene and a minor portion of a sulfonate containing monomer wherein the terpolymers are water insoluble and have about 18 to about 100 meq. of sulfonate groups per 100 grams of polymer.

7 Claims, No Drawings

ELASTOMERIC SULFONATE TERPOLYMERS AND PROCESS FOR FORMING THE SULFONATED TERPOLYMERS

CROSS REFERENCE TO RELATED APPLICATIONS

This is a continuation of application Ser. No. 326,544, filed Dec. 2, 1981, now abandoned, which is a continuation-in-part of U.S. Ser. No. 278,423, filed June 29, 1981, now abandoned which is a Rule 60 Continuation of U.S. Ser. No. 117,197, filed Jan. 31, 1980, now abandoned.

BACKGROUND OF THE INVENTION

Field of the Invention

The formation of sulfonate containing polymers has been clearly defined in a number of U.S. Pat. Nos. 3,642,728; 3,836,511; 3,847,854; 3,870,841; and 3,877,530. These patents teach the formation of sulfonate polymers by contacting a polymer having olefinic unsaturation with a sulfonating agent.

This application differs from the previously identified U.S. patents in that the instant process is directed at the free radical emulsion polymerization of a polymerizable vinyl monomer and a sulfonate containing monomer to form a substantially gel-free terpolymer having a major portion of the conjugated diene and a minor portion of the sulfonate containing monomer, whereby the terpolymer is water insoluble and substantially water insensitive. The sulfonate containing monomer is characterized by the formula:

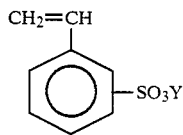

wherein Y is a cation selected from the Groups I-A, II-A, I-B or II-B of the Periodic Table or an amine of the formula $NHR_1R_2$ where $R_1$ and $R_2$ can be aliphatic groups of $C_1$ to $C_{12}$.

The formed terpolymers contain about 13 to about 48 wt. % styrene, more preferably about 20 to about 40 wt. % and most preferably about 25 to about 35 wt. %; about 55 to about 88 wt. % of butadiene, more preferably about 55 to about 80 wt. %, and most preferably about 65 to about 75 wt. %. The amount of sulfonate comonomer to be introduced into these systems can be defined in terms of weight percent chemically combined sulfur. The preferred range is at least 18 to 100 meq. of sulfonate groups per 100 grams of polymer.

SUMMARY OF THE INVENTION

The present invention relates to a free radical terpolymerization process for the preparation of sulfonate containing water insoluble terpolymers of styrene, butadiene and a monomer characterized by the formula:

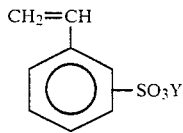

wherein Y is a cation selected from Groups I-A, II-A, I-B, or II-B of the Periodic Table or an amine of the formula $NHR_1R_2$ where $R_1$ and $R_2$ can be aliphatic groups of $C_1$ to $C_{12}$.

The terpolymers formed from the free radical emulsion terpolymerization process of the instant invention can be generally described as having an $\overline{M}n$ of about 5,000 to 200,000 and having at least about 0.5 wt. % of chemically combined sulfur therein. The free radical terpolymerization process of the instant invention can be generally described as a free radical emulsion polymerization of styrene and butadiene monomers with a sulfonate monomer which is water soluble, at a temperature sufficient to cause polymerization, wherein the initiator is preferably based on a peroxide initiator accelerated by a reducing agent, and suitable surfactants are employed. Upon completion of the free radical polymerization, the resultant latex is coagulated and the water insoluble terpolymer is recovered.

PRIOR ART

Copolymers and terpolymers containing sulfonate monomers at low levels have been described previously in the art. For example, U.S. Pat. No. 3,306,871 describes the preparation of latices based on several different vinyl monomers. This prior art is particularly relevant to the instant invention because it distinguishes those features which are characteristic of much of the prior art in the area of metal sulfonate ionomers.

The maximum wt. % of sulfonated monomer in the formed polymers of 3,306,871 is 3 wt. % and these polymers are incapable of forming ionically cross-linked polymers with excellent physical properties such as tensile strength, whereas the minimum wt. % of sulfonte monomer in the instant polymers is 4 wt. % (which is equivalent to about 18 meq. of sulfonate groups per 100 grams of polymer) and these polymers are capable of forming highly ionically cross-linked polymers with vastly improved physical properties such as tensile strength.

It has become clear, based on recent work, that sulfonate ionomers can manifest many peculiarities which make their characterization extremely difficult. The foremost of these is a strong ionic cross-linking which makes such materials difficult to dissolve in solution or to achieve melt flow.

These techniques are necessary to characterize a polymeric product for subsequent use, for example, as a thermoplastic elastomer or as an oil additive or in similar polymeric applications. The quantification of melt flow properties or selected solution properties, therefore, becomes an extremely important step in order to know whether these ionomeric products are even being prepared in a reproducible fashion or whether they are suited for selected applications.

This particular problem is exacerbated even more when describing co- or terpolymers of diene monomers and metal or amine sulfonate containing monomers, for in this latter case, the probability of a high degree of covalent cross-linking is extremely likely. When the concurrent problems of ionic cross-linking and covalent cross-linking are now combined with problems of achieving uniform co- or terpolymers obtained from a relatively non-polar hydrocarbon monomer and a highly polar salt molecule, which are normally completely immiscible, and the normal problems of molecular weight control desired of all polymer systems, it becomes evident why there is a paucity of information concerning the characteristics of the isolated sulfonate ionomers obtained by copolymerization of dienes and metal or amine sulfonate containing monomers. In fact, a review of the patent art and the literature suggests that a complete characterization of such systems has not often, if ever, been previously attempted.

Possibly, for the above reasons, most of the patent art in this area describes the latices achieved by the presumed reaction of such sulfonate monomers with selected vinyl and diene monomers. That the products are copolymers is presumed by suggestions that the resulting latices are more stable, more water resistant and more adherent than those obtained in the absence of the sulfonate monomer.

The instant invention is directed at a different class of terpolymers of styrene, butadiene and metal or amine sulfonate containing monomers. This invention is concerned with the preparation and resultant compositions of terpolymers of styrene, butadiene and sulfonate monomers which are of desirable molecular weights, are substantially free of covalent cross-linking (less than 10% of the product appears as gel in prescribed tests), contain sulfonate levels of from 0.5 wt. % chemically combined sulfur, up to 5 wt. % chemically combined sulfur, are water insoluble, and are prepared by a process designed to give products substantially free of homopolymers of any of the polymerizable components, and are solid products, characterizable in terms of reduced viscosity, molecular weight and/or melt flow (at elevated temperatures).

The polymers formed by the instant process are those strictly limited to species, wherein the sulfonate groups are affixed only to the aromatic rings. For example, in the copolymerization of sulfonated styrene monomer and butadiene monomer, one forms, by the instant process, a sulfonated styrene-butadiene polymer, wherein all the sulfonate groups are affixed to the aromatic rings. In contrast, when one sulfonates a polymer containing both aromatic groups and aliphatic groups by a direct sulfonation process such as those disclosed in U.S. Pat. Nos. 3,072,618; 3,072,619; 4,186,163; and 3,396,136, one obtains a sulfonated species, wherein the majority of sulfonate groups are affixed to the non-aromatic portion of the polymer. The instant experimental results clearly show that when one directly sulfonates a styrene-butadiene copolymer, at least 84 mole % of the sulfonate groups are affixed to the non-aromatic portion of the styrene-butadiene copolymer, wherein, the styrene-butadiene copolymer formed by the instant, unique and novel process has 100 mole % of the sulfonate groups affixed to the aromatic rings of the styrene portion of the styrene-butadiene copolymer.

In light of the above distinguishing features, it is readily apparent as to why the products and process of the instant invention differ from those of GB Patent 895,033. That patent addresses specifically, latices based on copolymerization of a suitable aromatic vinyl sulfonic acid derivative with a variety of different polymerizable monomers. It is important to note that all aspects of that invention are solely concerned with the resultant latices, that the products are not described as isolated entities.

For the purposes of the instant invention, many of the features of the products in GB 895,033 are undesirable. For example, it is emphasized in that application that improved latex stability is an asset; for the purpose of the instant invention, that improved latex stability can be a debit in that difficulties may be encountered in isolating the solid polymer.

Another feature of the instant invention is that the instant disclosure is directed toward products which are demonstrated to be substantially free of covalent cross-linking and techniques whereby the ionic cross-linking desired in such systems can be separated from the covalent cross-linking. This demonstration has not been illustrated in the prior art to copolymers of sulfonate containing monomers with polymerizable comonomers. Without this illustration, it would be difficult, if not impossible, to employ the resultant products in some of their intended applications.

Finally, and most importantly, U.S. Pat. No. 3,306,871 and GB 895,033 specifically state in column 1, second paragraph of both patents, that those inventions were concerned with polymer latices, wherein the sulfonic acid salt is incorporated as an anionic stabilizer. It is important to emphasize that in the instant invention, the sulfonate is incorporated at specific levels to function as an ionic cross-linking agent. In these systems, the neutralized sulfonate provides a salt species which interacts with other salt species to provide a strong ionic cross-link. This characteristic is observed and desired, not in the latex form, but is extremely important in determining the bulk physical properties.

In light of the above discussion, it is apparent that the products of this invention differ markedly from those of the prior art in properties, in composition and in their specific structural features.

In addition, the catalysts or initiators employed for example, in GB 895,033 differ from those employed in the process of the instant invention. The prior art has suggested that either water soluble free radical-generating catalysts or oil soluble free radical-generating catalysts are suitable. Alternatively, U.S. Pat. No. 2,913,429 specifies that "it is necessary that the polymerization mixture include a water soluble peroxy compound as a catalyst and it is desirable, but not essential, that it also include an oil soluble catalyst ingredient." (column 2, line 28 forward)

The initiators of the instant invention are important and different from those of the prior art for it is believed that they function to give an optimum terpolymerization without significant incorporation of either a copolymer of styrene-butadiene or a homopolymer of the metal sulfonate monomer. If one employs substantial levels of an oil soluble initiator which can spontaneously polymerize solely in the hydrocarbon phase, those species can be polymerized without a corresponding incorporation of the sulfonate species. By appropriate selection of one catalyst component soluble in the polymerizable hydrocarbon phase and a second catalyst component in the aqueous phase, the interaction of these components can result in a more uniform terpolymerization, predominantly at the interface.

Another patent which can be considered to be relevant to the instant invention and which teaches ionic cross-linking is that of Rees, U.S. Pat. No. 3,322,734. U.S. Pat. No. 3,322,734 teaches that ionically cross-linked copolymers may be prepared via direct copolymerization and teaches how such ionic cross-linking can change the properties of polymers. However, that patent is specifically directed at neutralization levels of between 10 and 90% of the acid species present. The instant invention is directed at neutralization levels of 95% and above and preferably at ionomers which are 100% neutralized. The properties of the resulting material which are 100% neutralized are substantially different from those which are only 50% or 90% neutralized. Therefore, the instant invention is substantially different from that of U.S. Pat. No. 3,322,734.

In addition to the above art, mention should be made of U.S. Pat. No. 2,913,429 which is concerned with synthetic latices designed to form films which are based on aqueous dispersions of copolymers of one or more aliphatic conjugated diolefins with at least two monovinyl aromatic compounds including a monovinyl aromatic sulfonate. This invention differs from that prior art in the following:

(1) This application is not concerned with films from latices.

(2) That invention contains from 4 to 35, preferably from 5 to 15 wt. % sulfonate monomer, and thereby provides coatings or films which can readily be removed from substrates by washing or scrubbing with water. Obviously, these cited systems are designed to be water sensitive and thereby removable.

(3) That invention requires a water soluble peroxy compound as initiator whereas this application requires a hydrocarbon soluble peroxy initiator and a water soluble reducing agent.

(4) These polymers of 2,913,429 contain a maximum of 40 wt. % of conjugated diene and are thermoplastic in nature, whereas the elastomeric polymers of the instant invention contain a minimum of 55 wt % of conjugated diene.

(5) The polymers of 2,913,429 are water sensitive and films formed from these polymers can be removed from a substrate by washing with water, whereas the polymers of the instant application are water insensitive.

There are many other distinctions, but it is obvious that the above invention is directed at essentially rigid, removable paint films wherein the sulfonate groups provide adequate water sensitivity to permit the formation of a stable latex which further can be deposited as a removable film. Nowhere in that invention is the concept of a metal sulfonate copolymer possessing strong ionic crosslinks in the bulk product taught, inferred or even desired.

GENERAL DESCRIPTION OF THE INVENTION

The solid elastomeric terpolymers of the instant invention comprise a terpolymer of styrene, butadiene and a sulfonate containing monomer characterized by the formula:

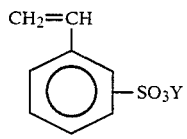

wherein Y is a cation selected from Groups I-A, II-A, I-B and II-B of the Period Table or an amine of the formula:

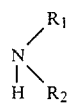

where $R_1$ and $R_2$ can be aliphatic groups of $C_1$ to $C_{12}$ or hydrogen, the terpolymer being water insoluble, and having at least about 18 meq. to about 100 meq. of sulfonate groups per 100 grams of polymer.

The polymers formed by the instant process are those strictly limited to species, wherein the sulfonate groups are affixed only to the aromatic rings. For example, in the copolymerization of sulfonated styrene monomer and butadiene monomer, one forms, by the instant process, a sulfonated styrene-butadiene polymer, wherein all the sulfonate groups are affixed to the aromatic rings. In contrast, when one sulfonates a polymer containing both aromatic groups and aliphatic groups by a direct sulfonation process such as those disclosed in U.S. Pat. Nos. 3,072,618; 3,072,619; 4,186,163; and 3,396,136, one obtains a sulfonated species, wherein the majority of sulfonate groups are affixed to the non-aromatic portion of the polymer. The instant experimental results clearly show that when one directly sulfonates a styrene-butadiene copolymer, at least 84 mole % of the sulfonate groups are affixed to the non-aromatic portion of the styrene-butadiene copolymer, wherein, the styrene-butadiene copolymer formed by the instant, unique and novel process has 100 mole % of the sulfonate groups affixed to the aromatic rings of the styrene portion of the styrene-butadiene copolymer.

The instant invention relates to the formation of sulfonate containing terpolymers which are formed by a free radical terpolymerization process. The monomers used in the free radical emulsion terpolymerization process are styrene and butadiene which are terpolymerized with sulfonate containing monomers.

In general, the styrene, butadiene and sulfonate containing monomers are dispersed in a water phase in the presence of an initiator which is preferably soluble in the butadiene-styrene phase and a water soluble reducing agent and a suitable surfactant, wherein the temperature is sufficient to initiate polymerization. The resultant latex is coagulated, usually by the addition of an aqueous salt solution, and the recovered terpolymer is washed with water and subsequently dried under vacuum at room temperature.

The terpolymers formed from the free radical terpolymerization of the instant invention can be generally described as having an $\overline{M}n$ of about 5,000 to about 200,000, more preferably about 10,000 to about 100,000.

The formed terpolymers contain about 13 to about 48 wt. % styrene, more preferably about 20 to about 40 wt. %, and most preferably about 25 to about 35 wt. %; about 55 to about 88 wt. % of butadiene, more preferably about 55 to about 80 wt. % and most preferably about 65 to about 75 wt. %. The amount of sulfonate monomer contained in these terpolymers is defined in terms of weight percent chemically combined sulfur. The terpolymers of the instant invention contain about 18 to about 100 meq. of sulfonate groups per 100 grams of polymer, more preferably about 18 to about 90, and most preferably about 20 to 80.

Sulfonate Containing Monomers

The sulfonate containing monomers of the instant invention which are water soluble can be generally described as monomers having unsaturation and a metal or amine sulfonate group. The metal or amine neutralized sulfonate monomer is characterized by the formula

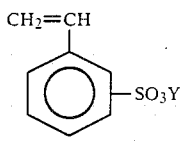

wherein Y is a cation selected from Groups I-A, II-A, I-B and II-B of the Periodic Table or an amine of the formula:

wherein $R_1$ and $R_2$ can be aliphatic groups of $C_1$ to $C_{12}$ or hydrogen. Particularly suitable metal cations are sodium, potassium and zinc, and an especially preferred metal cation is sodium. A typical, but non-limiting example of suitable sulfonate containing monomers is:

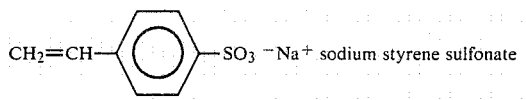 sodium styrene sulfonate

An especially preferred sulfonate containing monomer is metal sulfonate styrene. The molar ratio of sulfonate containing monomer to the mixture of styrene and butadiene is about 1/200 to about 1/5, more preferably about 1/150 to about 1/6, and most preferably about 1/100 to about 1/9.

The redox emulsion polymerization recipe used in this invention is effective in initiating the terpolymerization of water insoluble and water soluble comonomers in an emulsion system. Because the peroxide initiator is dissolved in the monomer and the amine redox activator is dissolved in water, the surface of the micelle/growing polymer particle is believed to be the locus of formation of initiator molecules as well as the polymerization locus. Water phase homopolymerization of the polar, water soluble monomer is effectively depressed because of low primary radical concentration in the aqueous phase.

Similarly, the activity of the free radical catalyst in the hydrocarbon monomer phase is substantially less than in the vicinity of the reducing agent. As a result, the polymerization of homopolymers is believed to be effectively depressed.

Reducing agents suitable for this invention are those known in the art with the additional requirements that they be soluble in water. A preferred reducing agent is triethylene tetramine.

A variety of free radical catalysts can be employed in this invention with the requirement that they are substantially soluble in the diene monomer phase. This includes a preferential class of free radical initiators such as benzoyl peroxide, cumene peroxide, diisopropylbenzene hydroperoxide, t-butyl hydroperoxide and similar systems which will be preferentially soluble in the monomer phase as opposed to the aqueous phase. There are a large number of such peroxides used in the art and those having the appropriate solubility behavior and suitable decomposition temperature in the presence of the reducing agents are satisfactory for the purposes of this invention.

The surfactants employed for this invention are varied and well-known in the art. The typical emulsifiers or surfactants can be employed; however, some are more effective than others in generating latices of better stability. A preferred emulsifier is sodium lauryl sulfate.

The buffering agents employed in the instant polymerization process are selected from the group consisting of sodium carbonate, ammonia, sodium acetate, trisodium phosphate, etc. These buffering agents are employed at a concentration of about 0.1 to about 5 grams per 100 grams water employed in the emulsion system.

Chain transfer agents can be readily employed in the instant polymerization process for controlling the molecular weight of the resultant copolymer. The concentration of chain transfer agent is about 0 to about 1.0 grams per 100 grams of the combined weight of the sulfonate containing monomer and the mixture of styrene and butadiene.

The free radical emulsion terpolymerization of the water soluble sulfonate containing monomer and the mixture of styrene and butadiene yields a stable latex, wherein the resultant water insoluble terpolymer is not covalently cross-linked and possesses substantial ionic cross-linking and has about 0.5 to about 5 wt. % of chemically combined sulfur, more preferably about 0.6 to about 3. The resultant latex can be coagulated by the addition of an aqueous salt solution to the emulsion at a volume ratio of the aqueous salt solution to total volume of the emulsion of about 10 to about 0.5, more preferably about 3 to about 7, and most preferably about 2 to about 1. The water insoluble terpolymer is recovered by filtration and subsequently washed with water and dried under vacuum conditions at about room temperature. Alternatively, the polymer can be coagulated by precipitation with alcohol such as methanol.

DETAILED DESCRIPTION OF THE PREFERRED EMBODIMENTS

As exemplified in the following illustrative Example, a terpolymer was prepared.

Example 1

Reaction Formulation:
- 12 g. styrene
- 28 g. butadiene
- 3.0 g. sodium styrene sulfonate (NaSS)
- 100 g. boiled, distilled water
- 4.6 g. sodium lauryl sulfate (emulsifier)
- 1.0 g. diisopropylbenzene hydroperoxide (initiator)
- 1.0 g. triethylene tetramine (reducing agent)
- 0.28 g. 1-decanethiol (chain transfer agent)
- 0.6 g. $Na_4P_2O_7.10H_2O$ (buffer)

A free radical emulsion polymerization was carried out in a 1-quart capped beverage bottle at room temperature ($\approx 25°$ C.). The reaction emulsion was agitated by means of a mechanical shaker. The reaction was carried out for 17.5 hours to a yield of about 95% and the latex was coagulated by the addition of methanol. The recovered polymer was washed with methanol and water and dried under vacuum at room temperature.

The styrene-butadiene-NaSS terpolymer contained 0.75% sulfur (23 meq. NaSS per 100 grams total polymer). The terpolymer was not tacky, appeared to be a strong, elastic-solid, and was soluble in a mixed solvent of toluene and methanol (90/10). In the absence of the methanol cosolvent, that is, in toluene alone, this material formed a swollen gel and could have been considered covalently cross-linked. Its solubility by the addition of 10% methanol shows, however, that the terpolymer is not covalently cross-linked.

The terpolymer was compression molded at 370° F. and analyzed using thermal mechanical analysis from −120° C. to 230° C. using a heating rate of 10° C./minute. A glass transition was clearly apparent at about −50° C. Above the glass transition, only a rubbery plateau was observed, behavior characteristic of a covalently cross-linked polymer. The tested sample, however, was completely soluble in a mixed solvent of toluene and methanol (90/10) which shows that it was not covalently cross-linked. The rubbery plateau which extended to above 200° C. is interpreted as evidenced of strong, persistent ionic cross-linking.

Microtensile dumbbells were cut from the compression molded pad described above and tensile measurements were made with an Instron Universal Testing Machine. The properties are shown in Table I. These properties are significantly higher than can be obtained in a non-covalently cross-linked copolymer not containing the NaSS, and they demonstrate the effect of the ionic cross-linking on the elastomeric mechanical properties.

TABLE I

| Tensile Properties of Styrene-Butadiene-NaSS Terpolymer | |
|---|---|
| Stress at 100% elongation | 395 psi |
| Ultimate Strength | 685 psi |
| Ultimate Elongation | 200% |

Most importantly, it is seen that the stress at 100% elongation of 395 psi is quite high compared to materials which do not possess ionic groups. It is often seen that such stress levels can be achieved at elongations of 1000 to 1500%; however, for many applications, it is much preferred that such properties be attained at lower strain levels. The terpolymers of the instant invention appear quite suited to achieve those characteristics.

Introduction to Examples 2 to 3

A series of sulfonated styrene-butadiene copolymers were prepared as outlined in the following Examples. The objective of these studies was to determine where the sulfonating agents functionalized the polymer. Previous work has suggested that both aromatic groups and unsaturation can be sulfonated when working with different polymer systems. In the case of aromatic sulfonate, it has been observed that those reactions conducted with acetyl sulfate and other mild sulfonating agents are not reactive at room temperature in hydrocarbon diluents. Therefore, it is expected that sulfonation with such reagents of styrene-butadiene copolymer would lead to a product where few, if any, of the aromatic groups were sulfonated under these conditions. If so, then the copolymerization of a vinyl aromatic sulfonate monomer with styrene and butadiene must lead to a different polymer structure than one obtained by sulfonation of preformed polymer. The following experiments will demonstrate that point.

EXAMPLE 2

Sulfonation of Styrene-butadiene With Acetyl Sulfate

A 2-liter, round-bottom, 2-neck flask fitted with a stirrer and water condenser was charged with:

100 g. finely diced styrene-butadiene 1502;
1000 ml. analytical grade hexane the polymer-hexane mixture was stirred overnight to insure dissolution of the SBR.

Fresh acetyl sulfate was prepared as follows:

16.8 ml. $H_2SO_4$ was slowly added lockwise to 43.2 ml. of chilled acetic anhydride stirring in a dry-ice bath to maintain temperature at −5° C. After addition of $H_2SO_4$ is completed, the resulting solution is allowed to warm to at least +5° C. prior to use.

Half of the SBR-hexane solution (550 ml.) was charged to a 1-liter flask and stirred while 2.5 ml. of the freshly prepared acetyl sulfate was added. The reaction mixture becomes light purple in color.

After allowing to stir for 60 minutes, a "free acid" sample (about 10 ml.) is removed, terminated in MEOH/water and subsequently steam-stripped and mill-dried. The remaining reaction mixture is neutralized with the addition of 3.4 g. sodium acetate in 22 ml. MEOH/2.7 ml. water. Stabilizer 2246 in the amount of 0.1 g. is added.

The neutralized reaction mixture is then steam-stripped to recover polymer which was then mill-dried (85° to 100° C.) to remove water.

Analysis of the recovered products show:
"Free acid"—0.51% Sulfur
Neutralized Polymer—0.27% Sulfur;
0.48% Sodium This and other polymers of varying sulfonate content were then analyzed by infrared spectroscopy to determine the specific sites where the sulfonate groups were attached.

EXAMPLE 3

Sulfonation of Styrene-butadiene Using SBR-1J02 Recovered from THF Solution by Precipitation in Water A solution of 100 g. styrene-butadiene 1502 in 1000 ml. tetrahydrofuran was prepared. The solution was poured into hot water to precipitate the SBR, followed by repeated washings with hot water. The recovered polymer was then mill-dried (85° to 100° C.) to remove water.

A solution of 25 g. of the above recovered and dried SBR was prepared in 250 ml. hexane.

To this SBR-hexane solution, 7.5 ml. of freshly prepared acetyl sulfate (preparation as described in Example 1) was added. A dark purple color developed. After 60 minutes of stirring, a 10 ml. "free acid" sample was taken, terminated in MEOH/$H_2O$ and subsequently steam-stripped and mill-dried.

The reaction was then neutralized with 10.2 g. sodium acetate in 66 ml. MEOH/8.1 ml. water. Finally, 0.1 g. of stabilizer 2246 was added. The neutralized reaction mixture was steam-stripped to recover polymer and mill-dried (85° to 100° C.) to remove water.

Analysis:
"Free acid"—1.93% Sulfur
Neutralized Polymer—1.31% Sulfur, 0.68% Sodium Analysis of Sulfonated SBR Products Via Infrared Spectroscopy The starting styrene-butadiene rubber (SBR) appeared to consist of about 25 weight styrene units. It is assumed that the distribution of butadiene units in the SBR is about 70 to 75% trans-1,4 units or type II trans unsaturation, and about 10–15% each of cis-1,4 units (II-cis unsaturation) and 1,2 units (vinyl or I unsaturation).

The sulfonated SBR samples examined in this study ranged from about 0.26 wt. % sulfur up to 1.31 wt. % sulfur. Sulfonated absorbence values were measured 585 cm$^{-1}$ and when plotted against sulfur values determined by elemental analysis, gave essentially a linear relationship (Table II). The absorbence value was arbitrarily set at 1.00 for the sample containing the highest sulfur content. These results show that the sulfur incorporated in these polymers can be shown to be directly proportional to sulfonate content determined by infrared spectroscopy. In selected samples, inorganic sulfate was also present as denoted by absorption peaks at 622 cm$^{-1}$. Sample 59-C (1.31% sulfur) exhibited no peaks at that wavelength.

A careful analysis was conducted on the mono-substituted aromatic ring absorption peaks at 760 cm$^{-1}$. Based on analysis of five samples, no more than 2.5% of the aromatic units in the starting polymer could have been involved in either sulfonation or alkylation reactions of Table II. Thus, a maximum of 16% of the sulfonate functionality can be associated with the aromatic units. In all probability, the actual value may be substantially less than that. In other words, at least 84% of the estimated sulfonate functionality in sample 59-C is probably located on butadiene units.

Infrared analysis of the behavior of vinyl unsaturation (1,2 butadiene units) shows that the introduction of 41.5 mmoles of sulfonate functionality per 100 grams of rubber can be responsible for a maximum of about 10 mmoles of sulfonate functionality being associated with the vinyl unsaturation of Tables IV and V. The remaining sulfonate functionality in this polymer sample (25 mmoles per 100 grams rubber) is therefore located on the 1,4-butadiene units. The complication in pinpointing the exact level of 1,4 unsaturation involved is due to the fact that the conditions of sulfonation induce a significant increase in type II unsaturation over the starting unsulfonated rubber. This increase may be a result of chain scission. These data are shown in Table VI. The important observation here is that an increase in sulfonate content at the higher sulfonate levels is correlatable with a significant change in both cis-1,4 and trans-1,4 unsaturation. Based on this analysis, there is no question that cis-1,4 structure is much more reactive and is consumed more readily under sulfonation conditions.

In summary, these infrared results can be interpreted unambiguously as demonstrating that sulfonation reactions occur predominantly on the unsaturated moieties of the SBR system. These data are completely consistent with the known lack of reactivity of the aromatic species with mild sulfonating reagents in non-polar solvents at ambient temperature. These data are also consistent with the demonstrated ability to sulfonated unsaturated polymers selectively in the presence of a large excess of an aromatic solvent. Therefore, the sulfonation of a polymer containing both aromatic groups and cis-or trans-1,4 unsaturation will lead to a product in which the sulfonate is predominantly located on the 1,4 unsaturation and not on the aromatic group.

TABLE II

| Relationship of Sulfonate Functionality and Elemental Sulfur Levels (Relative Basis) | |
|---|---|
| Weight % Sulfur | Sulfonation (585 cm$^{-1}$) |
| 0 | 0 |
| 0.26 | .125 |
| .45 | .28 |
| .60 | .46 |
| 1.31 | 1.00 |

TABLE III

| Relationship of Mono-Substituted Aromatic Rings (760 cm$^{-1}$ Absorbence) to Sulfonate Level (Relative Basis) | |
|---|---|
| Sulfonated Absorbence (585 cm$^{-1}$) | Aromatic Absorbence (760 cm$^{-1}$) |
| 0 | .99 |
| .13 | 1.00 |
| .28 | .975 |
| .46 | .98 |
| 1.00 | .99 |

TABLE IV

| Vinyl Unsaturation vs. Sulfonate Absorbence (Relative Basis) | |
|---|---|
| Sulfonate Absorbence (585 cm$^{-1}$) | Vinyl Unsaturation (585 cm$^{-1}$) |
| 0 | .995 |
| .13 | .98 |
| .28 | .98 |
| .46 | 1.015 |
| 1.00 | .995 |

TABLE V

| Type 1 Unsaturation vs. Sulfonate Absorbence (Relative Basis) | |
|---|---|
| Sulfonate Absorbence (585 cm$^{-1}$) | Type 1 Unsaturation (1640 cm$^{-1}$) |
| 0 | 1.00 |
| .13 | .99 |
| .28 | .96 |
| .46 | .92 |
| 1.00 | .89 |

TABLE VI

| 1,4 BUTADIENE Unsaturation (Trans II and Cis II) vs. Sulfonate Absorbence (Relative Basis) | | |
|---|---|---|
| Sulfonate Absorbence (585 cm$^{-1}$) | Trans II Unsaturation (960 cm$^{-1}$) | Cis II Unsaturation (1405 cm$^{-1}$) |
| 0 | .83 | .79 |
| .13 | .97 | .96 |
| .28 | 1.00 | 1.00 |
| .46 | .92 | .85 |
| 1.00 | .87 | .62 |

What is claimed is:

1. A solid water insoluble elastomeric terpolymer comprising about 13 to about 48 weight percent of styrene, about 55 to 88 weight percent of butadiene and a minor proportion of a metal or amine neutralized sulfonate monomer characterized by the formula:

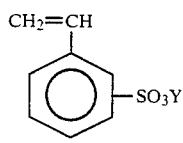

wherein Y is a cation selected from Groups I-A, II-A, I-B and II-B of the Periodic Table or an amine of the formula:

where $R_1$ and $R_2$ can be aliphatic groups of $C_1$ to $C_{12}$ or hydrogen, said terpolymer being water insoluble, having at least about 20 to about 80 meq. of sulfonate groups per 100 grams of polymer, and having a reduced viscosity as measured in a solvent at a concentration of 10 gm/liter of greater than 0.7 and less than 5.0, wherein said sulfonate groups are affixed to the aromatic rings of said terpolymer said terpolymer not being able to form a latex in an aqueous solution.

2. A terpolymer according to claim 1, wherein said sulfonate containing monomer is a metal neutralized sulfonated styrene.

3. A solid elastomeric polymer according to claim 1 wherein said terpolymer has about 18 to about 90 meq. of sulfonate groups per 100 grams of polymer.

4. A solid elastomeric terpolymer according to claim 1, wherein said terpolymer has about 20 to about 80 meq. of sulfonate groups per 100 grams of polymer.

5. A solid, elastomeric, substantially gel-free thermally stable and oxidatively stable terpolymer comprising about 13 to about 48 weight percent of styrene, about 45 to about 88 weight percent butadiene and a minor proportion of a metal or amine neutralized sulfonate monomer characterized by the formula:

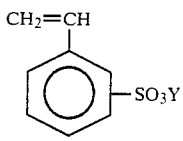

wherein Y is a cation selected from Groups I-A, II-A, I-B and II-B of the Periodic Table or an amine of the formula:

where $R_1$ and $R_2$ can be aliphatic groups of $C_1$ to $C_{12}$ or hydrogen, said terpolymer being water insoluble having at least about 20 to about 80 meq. of sulfonate groups per 100 grams of polymer with a reduced viscosity as measured in a solvent at a concentration of 10 gm/liter of greater than 0.7 and less than 5.0, wherein said sulfonate groups are affixed to the aromatic rings of said terpolymer.

6. A terpolymer according to claim 5, wherein said sulfonate monomer is a metal neutralized sulfonated styrene.

7. A terpolymer according to claims 1, 2, 5 or 6 wherein said solvent is selected from the group consisting of tetrahydrofuran, 1,2-ethylene dichloride, toluene, xylene, a mixture of 95 vol. % of toluene and 5 vol. % of methanol, and a mixture of 90 vol. % of hexane and 10 vol. % of isopropanol.

* * * * *